March 30, 1937. F. O. ANDEREGG 2,075,633
REENFORCED CERAMIC BUILDING CONSTRUCTION AND METHOD OF ASSEMBLY
Filed May 27, 1936 2 Sheets-Sheet 1
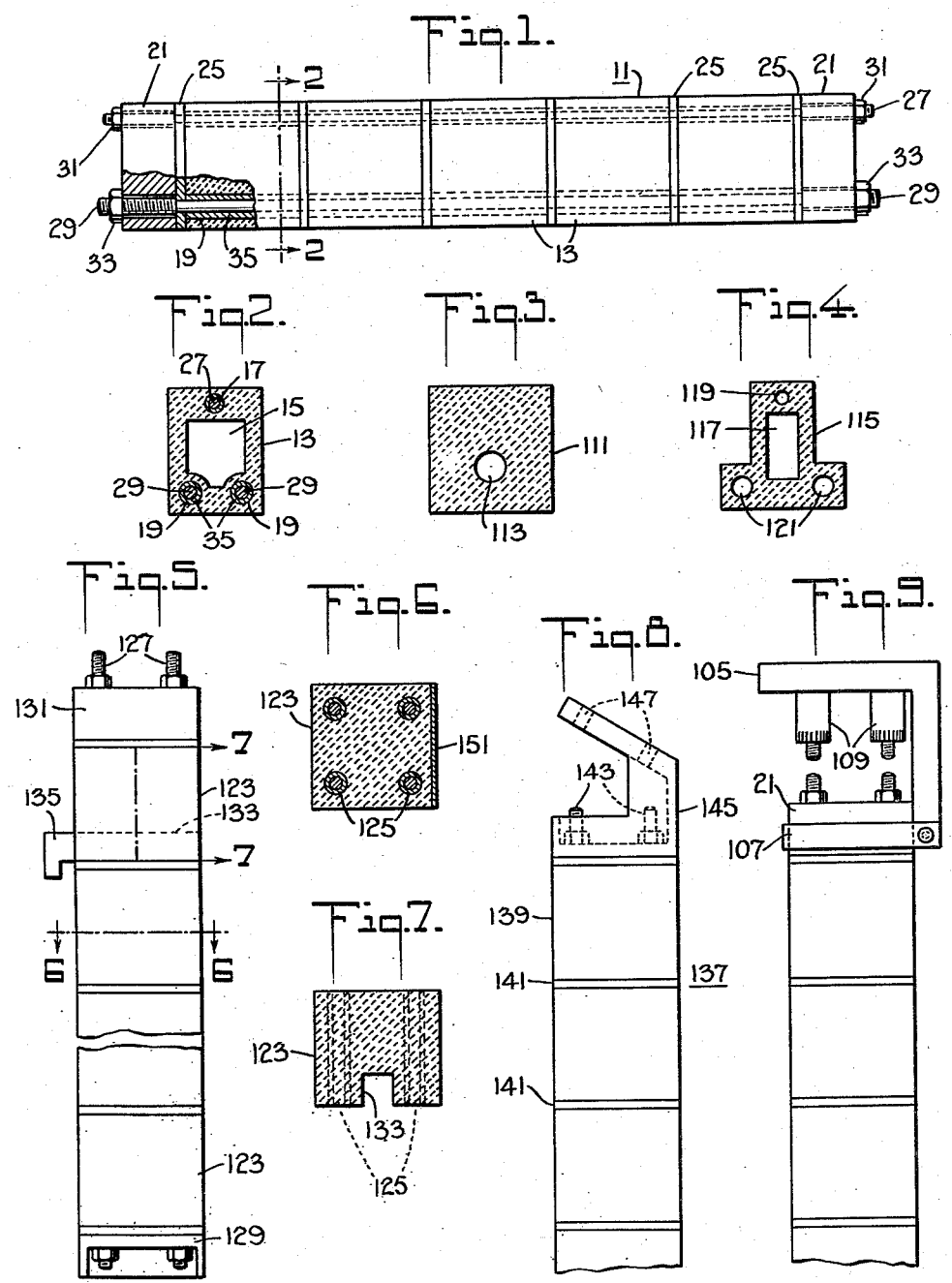
INVENTOR
Frederick O. Anderegg
BY
HIS ATTORNEY March 30, 1937.  F. O. ANDEREGG  2,075,633
REENFORCED CERAMIC BUILDING CONSTRUCTION AND METHOD OF ASSEMBLY
Filed May 27, 1936  2 Sheets-Sheet 2
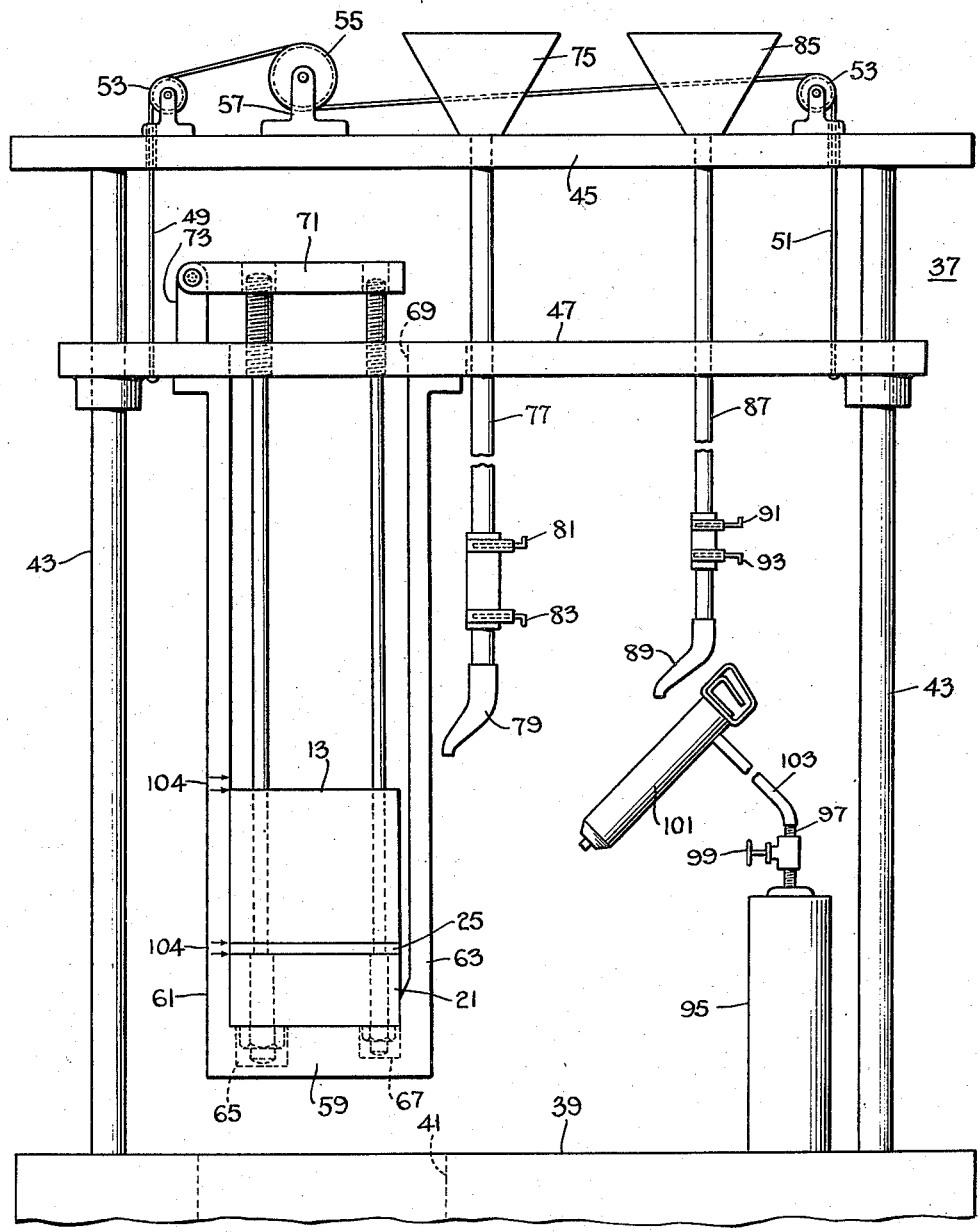
INVENTOR
Frederick O. Anderegg
BY
HIS ATTORNEY Patented Mar. 30, 1937

2,075,633

UNITED STATES PATENT OFFICE 2,075,633

REENFORCED CERAMIC BUILDING CONSTRUCTION AND METHOD OF ASSEMBLY

Frederick O. Anderegg, Newark, Ohio

Application May 27, 1936, Serial No. 81,993

12 Claims. (Cl. 72—67)

My invention relates to building members and particularly to composite beams, rafters, lintels, columns, walls, etc., for use in buildings.

An object of my invention is to provide a composite unit that is relatively light in weight in comparison to the total load which it can safely carry.

Another object of my invention is to provide a composite building unit that shall be capable of being easily and quickly assembled and which can be easily handled in the building construction.

Another object of my invention is to provide a method for quickly assembling such composite units in the proper manner.

Another object of my invention is to provide a composite building unit preferably embodying ceramic or argillaceous material capable of carrying a high load, that shall embody means protected by it for holding it in assembled relation.

Another object of my invention is to provide a method of and means for ensuring that the tie rods of each unit shall be stressed to the proper desired values.

Another object of my invention is to provide a composite building member embodying ceramic blocks so preformed as to have substantially like dimensions, with measured quantities of mortar or a preformed bonding gasket between adjacent blocks, and openings in the blocks for receiving one or more tension rods, all such ceramic elements being of a character having high compressive and bonding strengths, with at least one tension rod extending through the alined blocks, which tension rod is preferably made of a high grade metal or alloy steel having a high yield point.

Other objects will either be pointed out in the following specification describing a preferred form of my invention, or will be apparent from such description.

This application is a continuation, in part, of my copending application Serial No. 738,504 filed Aug. 4, 1934.

In carrying out the method of my invention, I assemble ceramic blocks, preshaped to suitable coordinating form and provided, respectively, with a passage or passages therethrough, in end to end aligned relation, the passage or passages through each block aligning with those of other blocks to provide a composite passage through the assembled blocks for reception of suitable tying means such as a tie rod of steel, having a high yield point.

Bonding means such as mortar, a neat cement coating, or a preformed bonding gasket is disposed between contiguous blocks of the assembly, and the whole is subjected to compression for the necessary curing period of the bonding means by effecting suitable stressing of the tying means. Further stressing of the tying means after curing of the bonding means, effects reinforced rigidity and high load bearing characteristics to the resulting composite building member.

In the drawings, illustrating certain preferred forms of my invention:

Figure 1 is a view, in front elevation, of a composite building member embodying my invention, a part being shown in section;

Fig. 2 is a view, in lateral section therethrough, taken on the line 2—2 of Fig. 1;

Fig. 3 is a view, in lateral section, through a simple form of ceramic block used in making my composite building member;

Fig. 4 is a view, in lateral section, through a modified form of ceramic block which I may use in making my composite building members, particularly when used as floor-supporting beams;

Fig. 5 is a view, in front elevation, of a composite building member when designed to be used as a column;

Fig. 6 is a view, in lateral section therethrough, taken on line 6—6 of Fig. 5;

Fig. 7 is a view, in longitudinal section through one of the ceramic blocks taken on the line 7—7 of Fig. 5;

Fig. 8 is a fragmentary view, in front elevation, of a composite building member showing particularly the use of end clamping plates as connecting members;

Fig. 9 is a view of a device for obtaining predetermined stresses in the tie rods;

Fig. 10 is a schematic view, in front elevation, of an assembly structure which I may use in assembling the building members embodying my invention.

Referring to Fig. 1 of the drawings, I have there illustrated a composite building member 11, which may be of any desired area and shape of cross section and of any desired overall length. Member 11 includes a plurality of ceramic building blocks 13, which are here shown as being substantially rectangular in lateral section, as may be noted by reference to Fig. 2. Each of the blocks 13 may be provided with a central opening 15 extending longitudinally therethrough in order to decrease the weight of the respective blocks. This opening is located around the neutral axis of the block, to remove only that part of the block which is least effective in taking the compression and the tension stresses. Each block is further provided with a passage 17 extending longitudinally therethrough through the upper web portion of the block, and with a pair of passages 19 located near the bottom corners of the block, the passages 17 and 19 being usually made of substantially circular shape in cross-section, the diameter of the passages 19 being usually greater than the diameter of passages 17. A clamping or pressure plate 21 is provided at each end of the composite member 11 and is preferably made of iron or steel, which will not rust to any appreciable extent and which is provided with a plurality of openings therethrough, the location and size of the openings being such as to cooperate with the passages 17 and 19 and to register therewith. Bonding means in the form of a relatively thin layer of a high grade mortar or of a preformed bonding gasket of suitable material, 25, is located between each end block 13 and the clamping plate 21, as well as between adjacent spaced blocks 13.

An upper tie or tension rod 27 extends through the aligned passages 17 in the blocks and through the plates, while a pair of tie rods or tension rods 29 extend through the respective aligned passages 19 in the blocks and in the metal plates. The end portions of the tie rods may be upset or enlarged as shown for one of the rods 29, to obtain greater strength of the threaded portion and permit of easier tightening of the nuts to be placed thereon. Nuts 31 may be located on the tie rod 27 at the outer faces of the clamping plates 21 and nuts 33 may be located at the ends of the tie rods 29 at the outer faces of the clamping plates 21.

I prefer to make the blocks from a high grade material, such as shale ground so that the particles will pass an eight-mesh screen or finer. This material is mixed with water and preferably subjected to an air-exhausting operation in a vacuum device, so that when the ceramic material is extruded or pressed into shape the amount of air in the blocks is a minimum and the blocks themselves are relatively dense. Other materials which may be used in making the blocks include natural building stones, well annealed pressed glass, a material known to the trade as Rostone, sand-lime bricks and cast slag, and other argillaceous materials, the main consideration and requirement being that the shaped blocks shall have a relatively high compressive strength, shall not change because of or be affected by atmospheric conditions, and shall be substantially uniform as to dimensions. The opening for a tie rod or a plurality of such openings, is of course provided during the extrusion or pressing operation. By proper selection of the materials and by properly treating or operating on the same, as well as by the proper method of manufacture, blocks are being produced commercially having a compressive strength of at least 20,000 pounds per square inch, this value rising to a value on the order of 27,000 pounds per square inch in some cases.

When making the blocks from shale or a similar material, they are burned, after forming, at a relatively high temperature, this temperature being substantially the same as that used in the burning of very hard paving bricks, the main object being to obtain a solid, hard block having the proper range of compressive strengths. The shape and size of the blocks will of course vary within relatively wide limits depending upon the particular use to which the building member is to be put.

The mortar which I may use for the individual layers 25 between the different elements of the building member, is advantageously made from carefully selected materials and is carefully handled during its preparation in order that it shall have a compressive strength substantially the same as that of the ceramic blocks, while at the same time having relatively high bonding power. As an example of the materials and the proportions thereof which I may use, the following materials and proportions may be mentioned: 34 pounds of high early strength cement, 6 pounds of air-floated fire clay and 100 pounds of sand which has been screened through a ten-mesh screen. These materials are carefully and thoroughly mixed with each other to obtain a uniform mixture throughout and are then mixed with the proper amount of water. I prefer to make the bonding cement constituting the layers 25 of a somewhat thicker or stiffer consistency than that of the layers 35 of the mortar which are located in the passages 17 and 19 in the space between the respective tie rods and the walls of these openings.

Instead of using the finely ground fire clay I may use some other similar plasticizing material to insure intimate contact between the block and the mortar or between the mortar and the tie rod. Metallic hardeners such as crushed iron mixed with chemicals, such as ammonium chloride, to cause expansion thereof, or aggregates, such as crushed iron or Portland cement clinker, may also be used to improve the quality of the mortar.

For convenience of assembly, the individual layers 25 may comprise pre-formed bonding gaskets, dimensioned to accord with the cross-sectional area of the units 11, as is shown in Figs. 2, 3, 4, 6 and 7. Such gaskets are preferably produced from a sheet of fibrous material such as matted asbestos containing hydraulic cements, and afford, on wetting and placing between adjacent blocks, or between a block and an end plate, a tight bond therebetween. Being compressible, the gasket will readily conform to the roughness or irregularities of the surfaces of the ends of the blocks. A dry mixture of suitable clay, high strength Portland cement, and asbestos used in the formation of the gasket, gives excellent results. Such gasket may be stored dry until ready for use in the manner above described.

Another type of gasket may be prepared from magnesium oxide suitably burned and mixed with dry asbestos to form a mat. Such type of gasket may also be stored dry. For use, it is soaked in a solution of one of the salts of magnesium oxide, so that when in position it will set and harden, and bond securely to the adjacent end plate and/or block surfaces.

If the end faces of the ceramic blocks are rough, it may be desirable under some circumstances to grind them smooth; however, the gaskets will ordinarily be sufficient to compensate for the usual degree of roughness found in commercially prepared blocks.

Where the ends of the ceramic units are relatively smooth, it may be sufficient to coat such ends with a neat cement slurry applied by means of a brush, just before assembly.

In assembling the building member 11, the blocks 13 are aligned in end to end relation with the respective passages 17, and 19, 19 of respective blocks disposed in end to end aligned relation, and the bonding means 25 interposed between adjacent blocks. The blocks 13 may be assembled in aligned relation inclusive of the interposed bonding means before insertion of the tension rods 27 and 29, 29 therethrough, or the blocks 13 may be slid onto the properly spaced tension rods one by one, the bonding means being inserted successively between respective blocks as they are slid into position.

The nuts 31 are tightened to a predetermined degree on respective threaded ends of the tension rod 27, and nuts 33 are tightened likewise on respective threaded ends of the tension rods 29, 29 to effect compression of the assembly of blocks 13 during the stage of hardening or curing of the bonding material 25 between blocks.

After a length of time sufficient to properly harden or cure the bonding material has passed— in the case of the bonding gaskets this time is very short—the nuts on the respective tension rods are tightened further, to impart final stress to the respective tension rods, and prestressed characteristics to the resulting building member.

A careful consideration of all the details entering into the problem of making high strength composite building members and numerous tests on such members indicate that the following are at least some of the considerations to be regarded to obtain best results in the construction and assembly of such units: a substantially perfect contact between the layer of mortar and the ceramic block should be effected at the time when the two parts are brought into engagement for the first time. The mortar should be spread evenly and compacted very thoroughly. Each block, as it is located in proper operative position, should be mechanically vibrated to effect good contact between it and the mortar. The integrity of the contact engagement between the mortar and the blocks or between the mortar and the tie rods or the end plates, once having been established, should be maintained, especially until the mortar has hardened, by proper loading or compressing of the assembled composite member. This latter step will also ensure that the shrinkage in the layers of mortar will be reduced to a minimum whereby any appreciable change in the overall dimension of the composite member will be prevented.

In order to carry out the method of assembly embodying my invention, I may use a device such as shown in Fig. 10 of the drawings.

A framework, designated generally by the numeral 57, may include a base plate 39 having an opening 41 therein at one part thereof, a plurality of vertical standards 43 whose bottom ends are secured to the base portion 39 in any suitable or desired manner and a top platform 45 resting upon and secured to the upper ends of the standards 43 in such manner that a self-supporting structure will be obtained. A movable platform 47 slides vertically upon the standards 43 and its position may be adjusted by means of a plurality of cables 49 and 51 the lower ends of which are secured to the platform 47 to support the same.

A suitable plurality of cable sheaves 53 are supported on a top platform 45, the respective cables 49 and 51 passing over these sheaves and having their other ends secured to a cable drum 55 which is supported in suitable bearings 57 on the top of platform 45. A part of each cable 49 and 51 is normally wound up on the drum 55 so that, by proper rotation of the drum 55 by any driving means (not shown) the movable platform 47 may be caused to move vertically upwardly or downwardly on the standards 43.

A supporting platform 59 is suspended below the platform 47 by structural members 61 and 63 depending from and secured to the lower face of movable platform 47. Member 59 may either be integral with supporting members 61 and 63 or may be removably secured thereto and is preferably provided with a plurality of recesses 65 and 67 in its upper surface to receive the nuts 31 and 33 and the lower end portions of tie rods 27 and 29. These tie rods normally extend vertically upwardly between the supporting elements 61 and 63, passing through an opening 69 in movable platform 47, with their upper ends held in proper operative positions relatively to each other and in parallel-spaced relation with the supporting elements 61 and 63 by a pivotally mounted spacing bar 71 supported by a lug 73 extending above the upper surface of movable platform 47. The spacing bar 71 is provided with a suitable plurality of recesses in its lower surface to receive the upper end portions of the tie rods. A hopper 75 is located on the top platform 45 and has connected therewith a depending conduit 77, at least a part of which may be flexible as shown at 79, and which is further provided at some convenient point near its lower end with two laterally movable sliders 81 and 83, located one above another at a predetermined distance to receive therebetween a definite measured quantity of relatively heavy mortar from the hopper 75 to be conducted to and spread upon the lower clamping plate or one of the ceramic blocks. A second hopper 85 is also located on the upper surface of the top platform 45 and has depending therefrom a conduit 87, a part of whose length may be flexible, as shown at 89. An upper slider 91 and a lower slider 93, each movable laterally in the conduit 87, permit of measuring a definite quantity of mortar from the hopper 85 to be conducted to and located between the tie rods and the wall of the opening in a block through which the rods extend.

Means for mechanically vibrating or tapping the individual ceramic blocks 13 which will be located one after the other in superposed positions strung on the tension rods, includes a storage tank 95 to contain compressed air and preferably located on the floor portion 39. An outlet pipe 97 controlled by a valve 99 permits an operator to energize and use an air hammer, shown generally at 101, and connected to the outlet pipe 97 by a suitable length of flexible hose 103.

The general method of assembling a composite building member by the use of the device shown in Fig. 10 is substantially as follows: it is assumed that hopper 75 is filled with a quantity of the relatively thick cement mixture hereinbefore described to be used as the mortar to be located between adjacent faces of the ceramic blocks or between one face of an end block and of a metal clamping plate, while hopper 85 contains a quantity of a thinner cement adapted to be located around the respective tension rods in the passages extending longitudinally through the ceramic blocks 13, this mortar having been made in accordance with the hereinbefore described method and containing substantially the proportions of ingredients there mentioned. It is further assumed that one operator will be stationed on the lower floor or base plate 39 to perform certain operations, while a second operator will be stationed on the vertically movable platform 47 to perform certain other operations necessary in quickly assembling a composite building member. The lower clamping plate 21 and the proper number of tie rods 27 and 29, together with the nuts thereon will be located in proper operative position on support 59, the upper ends of the tie rods being held by the spacer rod 71. The operator on the lower platform will permit a measured amount of relatively heavy mortar to flow on top of the upper surface of plate 21 as by first moving slider 81 outwardly and then inwardly, and then moving lower slider 83 outwardly to permit the amount of cement initially located between the two sliders to flow onto the upper surface of plate 21 and distributes the same thereon. A block 13 is then located over the upper ends of the tie rods and is lowered thereon by the operator on the upper platform 47, by any suitable means, until it rests on the layer of mortar which has just been located as above described on plate 21. In order to distribute the mortar evenly over the area of the surfaces on or between which it is located, the operator on the lower platform now uses the air hammer 101 to vibrate the block 13 in both a horizontal and in a vertical plane. A measured quantity of relatively thin mortar from the supply pipe 87, by manipulation of the sliders 91 and 93 in proper sequence, is located in the respective passages in the block surrounding the tie rods and the vibration of the block 13 or of the tie rod in a horizontal plane can be used to cause this filling and tie rod bonding material to be settled and compacted around the tie rods. Height indicators 104 are provided on the member 61 to guide the operator in his assembly work and to ensure that the overall length of an assembled member shall be correct to within a small variation.

A second measured quantity of the thicker mortar is then caused to flow on the upper surface of the block 13 and distributed thereon, after which the second operator causes another block to be lowered, as was described above, into proper operative position on the rods and on top of the last amount of mortar located on the block 13 and the platforms 47 and 59 are automatically lowered through a distance substantially equal to the height of a block, so that the operator in vibrating the last added block may be enabled to work thereon at always the same height and therefore to the best advantage. The lower operator then again uses the air hammer to vibrate the topmost block, these successive steps being repeated in proper order until the desired number of blocks have been assembled on the tie rods. The upper clamping plate 21 is then put in place on a layer of mortar on the upper face of the topmost block, after which the threads at the upper ends of the rods are cleaned and lubricated and the upper nuts 31 and 33 are located on the respective tie rods and are tightened up to obtain initially a certain amount of compressive stress on the blocks and the layers of mortar. For ordinary sizes of composite members I may tighten up the nuts as much as can be done by an operator using a 14 inch wrench. The built up member is then removed from the assembly device.

For the final prestressing operation, a tension measuring device, see Fig. 9, may be used. Such device includes a frame 105, which may be of substantially L-shape, and which is secured to some part of the composite member as by a clamping strap 107, which may extend around the end clamping plate 21 at one end or the other end of the member. If the ceramic blocks are considered to be substantially incompressible, as is practically the case, it is permissible to mount the tension measuring device as shown in Fig. 9 of the drawings, but it is within the scope of my invention to make the device long enough to engage the other end of the tension bolts or rods. Two micrometers 109 are provided when two tension bolts are used and are secured against a part of the frame 105 but it is understood that the number of micrometers corresponds to the number of tension bolts. The increase in the length of the tension bolts or rods can thus be easily and accurately measured during the process of turning the nuts on the ends of the respective tension rods, from which the tension effected in the tension rods can be determined by the proper mathematical formula.

I prefer to use a high grade steel or steel alloy for the material of the tension rods, having a yield point ranging from 60,000 to 115,000 pounds per square inch and which is stressed to a value of from one half to two thirds of its initial yield point, or to a value preferably on the order of 75,000 pounds per square inch, to thereby effect an initial compression of the blocks which is a large fraction of the ultimate compressive strength of the blocks and which causes a compressive prestressing on the lower or tensile side of the blocks to provide a carrying capacity greater than required for the design loading.

Referring now to Fig. 3 of the drawings, I have there illustrated a simple form of ceramic block 111, which may be of substantially square shape in lateral section and be provided with a single opening therethrough designated by numeral 113, and it is to be noted that this opening is located nearer to one side of the block than it is to the other side, and it is to be understood that the block is shown in its upright position, so that a tension rod extending through a plurality of alined blocks will be located near to the ultimate tension fiber of the blocks.

Fig. 4 of the drawings shows another form of ceramic block 115, which is of substantially inverted T-shape and has an opening 117 therethrough to reduce the weight of the block. This large opening serves also to reduce the net area of the block immediately adjacent to the neutral axis of the beam, (and particularly below the neutral axis) to reduce the area of cross section of the tension belts which is necessary to obtain the prestressing which will carry the design loading. An upper relatively small opening 119 and a plurality of larger openings 121 adjacent to the lower side of the block extend therethrough and are adapted to receive tension rods, as was hereinbefore described in connection with the blocks 13 shown in Fig. 2 of the drawings. A structural member made up of a number of blocks 115 may be used as a floor-supporting beam, tiles or plates constituting the floor being adapted to be supported on the lateral extensions of the blocks.

Building members embodying my invention may also be made for use as columns, and I have illustrated such a member in Fig. 5 of the drawings. A plurality of blocks 123, which may be of substantially square shape in cross section, are each provided with a plurality of longitudinally extending openings 125 therethrough, preferably located adjacent to the outer periphery of the block as shown in Fig. 6 of the drawings. A corresponding plurality of tension rods 127 extend through the openings 125 and also through and clamping plates 129 and 131 at the respective ends of the composite member. End clamping plate 129 may be of the recessed type so that the ends of the tension bolts will not project beyond the outer end face of the clamping plate. Plate 131 is of substantially the same kind as are the clamping plates 21 shown in Fig. 1 of the drawings. The tension rods 127 may extend some distance beyond the upper face of plate 131 to permit of attaching thereto another column superposed thereon, or of securing some other building member thereto, as by suitable sleeve couplings, or in any other appropriate manner.

Fig. 7 of the drawings shows an important detail of construction of the respective blocks 123 in that certain of these blocks are provided with a lateral opening 133 extending therethrough. These openings may be either round or square in cross section and are provided to receive a laterally extending holding or clamping member 135, which may be put to various uses, such as supporting some other structural element or for clamping a structural element to the column, or for clamping the column to some other member. These openings may all extend in one direction or they may extend in a plurality of directions at right angles to each other.

Fig. 8 illustrates a modified form of device embodying my invention and comprising a column 137 of substantially the same construction as was hereinbefore described in connection with Fig. 5 of the drawings. It embodies a plurality of blocks 139 bonded to each other by layers 141 of mortar and held in compression by a plurality of tension rods 143 extending through the aligned openings in the blocks 139 as well as through a special form of end clamping and connecting plate 145, which is of modified U-form in shape. One leg portion of member 145 is adapted to be located adjacent to the upper end of column 137 and to have the tension bolts 143 extend therethrough, while the other leg thereof is located a suitable distance above the first named leg, extends at any desired angle relatively thereto and is provided with a plurality of openings 147, through which tension rods of a rafter (not shown in the drawings) may extend to permit of securing the lower end of the rafter to the upper end of the column 137.

It is obvious that numerous other shapes of ceramic blocks may be used as required for special applications and that the form of the clamping end plates may also be varied within wide limits to meet particular problems of building construction.

It is to be noted that I employ either larger tension rods, or a larger number of tension rods, or both, in these parts of the blocks located nearest to the ultimate fiber in tension in composite building members designed to be used as beams. An analysis of the principles involved indicates that as a load is applied to the upper surface of such a beam, supported at only its ends, the compressive forces on the underside of the beam near the ultimate fiber become neutralized, during which the tension in the lower tie rods decreases. When the load on the beam is made large enough so that tension stresses would occur in the ceramic blocks and in the layers of mortar therebetween, the lower tie rods contribuate a reenforcing action the usual way, so that those tie rods are doubly effective. The brittleness usually accompanying extreme hardness and very high compressive strength of the blocks is not a drawback because of the prestressing, which may amount to ⅓ to ½ of the compressive strength of the blocks or up to 10,000 pounds per square inch.

As has hereinbefore been stated, I may use any one of a number of different materials for making the blocks, or suitable combinations of such materials and in connection with the use of such composite members as supporting elements in a building, one or more faces of which are visible, I may provide a facing coating indicated by numeral 151 in Fig. 6 of the drawings on at least one longitudinally extending face of the blocks, which coating may, for instance, have a particular color to match a wall or ceiling which is to extend coplanar therewith.

Whereas I have illustrated and described my invention with reference to specific forms thereof, it is to be understood that many changes may be made within the scope of the following claims.

I claim:

1. A method of making a composite building unit of high load carrying strength which includes the steps of assembling a plurality of ceramic blocks of high compressive strength on at least one tie rod with a relatively thin layer of mortar between adjacent blocks, slightly initially compressing the aligned blocks and then compressing the blocks after the mortar has hardened, to prestress them to a value which is greater than the design loading.

2. The method of assembling a composite beam of high load carrying strength which includes placing a number of ceramic blocks of high compressive strength in sequence in end-to-end position on a tie rod extending through said openings and of a lesser cross sectional area than the openings, filling the remaining space in the openings with a tie rod protecting and bonding material, locating and tamping a relatively thin layer of mortar between each pair of adjacent blocks, initially compressing said blocks by means of the tie rods with a compressive force of limited value, allowing the mortar to harden and then compressing said blocks by means of the tie rods with a compressive force that is greater than the design loading.

3. The method of making a composite building unit which includes the steps of locating a plurality of preformed perforated ceramic blocks in sequence on at least one tension rod whose area of cross section is less than the cross sectional area of the perforation in the blocks, filling the space between the rod and the wall of the perforation in the successive blocks with a measured quantity of a relatively thin mortar, effecting relative vibration of the block and the rod, applying a measured quantity of a relatively thick mortar in sequence to the outside face of the successive blocks, agitating each block as it is located adjacent to the preceding block, then prestressing the tension rod to a pre-determined degree to effect intimate contact between the mortar and the blocks and to compress the mortar, allowing the mortar to harden and then finally stressing the tension rod to obtain a tension stress therein of from one half to three quarters of the initial yield point thereof.

4. The method of making a composite building unit which includes the steps of locating at least one tie rod in a substantially vertical position on a platform, locating a clamping plate on the platform and around the tie rod, pouring a measured quantity of mortar on the clamping plate, locating a preformed ceramic block having at least one opening therethrough around the tie rod and above the layer of mortar, effecting vibratory movement of the block, continuing the steps of pouring mortar, locating additional blocks and causing vibratory movement thereof until a desired length of unit is reached, then providing a measured quantity of mortar on the outer face of the upper end block, locating a clamping plate thereagainst, tightening the tie rod to obtain a predetermined stress in the body of the unit, allowing the unit to rest to harden the mortar and then finally tensioning the tie rod to obtain a compressive stress in the blocks which is greater than any design loading.

5. The method of assembling a composite beam of high load carrying strength which includes placing a number of ceramic blocks of high compressive strength having an opening or openings therethrough in sequence in end-to-end position on a tie rod or tie rods extending through said openings and of a lesser cross sectional area than the openings, filling the remaining space in the openings with a tie rod protecting and bonding material, locating and tamping a relatively thin layer of mortar between each pair of adjacent blocks, initially compressing said blocks by means of the tie rods with a compressive force of limited value to cause good bonding engagement between the mortar and a block, maintaining said good bonding engagement until the mortar has hardened under moist conditions for a period of several days and then compressing said blocks by an increased tension on the tie rods to a value greater than the design loading.

6. A method of producing a composite building unit of high load carrying strength which includes the steps of assembling a plurality of building blocks of high compressive strength on at least one tie rod with a bonding means disposed between contiguous faces of adjacent blocks, initially compressing the aligned blocks, maintaining the aligned blocks under compression during a curing period, and finally further compressing the aligned blocks to prestress them to a value greater than the design loading.

7. A method of producing a composite building unit of high load carrying strength which includes the steps of assembling a plurality of building blocks of high compressive strength on at least one tie rod with a bonding gasket disposed between contiguous faces of adjacent blocks, initially compressing the aligned blocks, maintaining the aligned blocks under compression during a curing period, and finally further compressing the aligned blocks to prestress them to a value greater than the design loading.

8. A composite building unit comprising a plurality of shaped blocks of high compressive strength located in end-to-end relation, a relatively thin layer of mortar of high bonding strength between adjacent blocks and at least one tie rod maintained under tension and extending through all of said blocks, the said layers of mortar having been cured under compression less than that compression exerted by the maintained tension of said tie rod or rods.

9. A building unit comprising a plurality of ceramic blocks located in end-to-end relation, bonding material between adjacent blocks cured under compression so as to develop high bond and compression strength, and at least one tie rod extending through said blocks and maintained under a tension producing compression of said blocks greater than the compression thereof during the curing of said bonding medium, the area of cross section of the tie rods being proportional to the tension stress in the extreme fiber of the blocks occurring during maximum loading of the beam.

10. A composite building unit comprising a plurality of ceramic blocks located in end-to-end positions, each block having a compressive strength not less than 10,000 pounds per square inch of effective area of cross section, a layer of mortar, cured under compressive stress and having a compressive strength of not less than 8,000 pounds per square inch disposed between adjacent blocks, and at least one tie rod extending through said blocks and maintained at a tension producing compression of said blocks greater than the compression thereof during curing of said layers of mortar, the tensile strength of the tie rods being not less than 75,000 pounds per square inch.

11. A composite building unit comprising a plurality of ceramic blocks having a compressive strength on the order of 20,000 pounds per square inch, located in adjacent end-to-end relation, a layer of mortar cured under compressive stress and having a compressive strength substantially equal to that of the ceramic blocks, disposed between adjacent blocks and at the outer face of the end blocks, a clamping plate at each end of the unit, and at least one tension rod extending through the plates and the blocks clamping them together and maintaining them under compression greater than the compression of same during the stage of curing of said layers of mortar.

12. A composite building unit comprising a plurality of shaped blocks of high compressive strength positioned in end-to-end aligned relation, bonding means cured under compression between contiguous faces of adjacent blocks, and at least one tension rod extending through the assembly of blocks and effective to maintain the aligned blocks under compression greater than the compression of same during the stage of curing of said bonding means.

FREDERICK O. ANDEREGG.